United States Patent [19]
Schulze

[11] Patent Number: 4,589,703
[45] Date of Patent: May 20, 1986

[54] HYDRAULIC BRAKE PRESSURE REGULATOR

[75] Inventor: Bernd-Guido Schulze, Wolfsburg, Fed. Rep. of Germany

[73] Assignee: Volkswagenwerk Aktiengesellschaft, Wolfsburg, Fed. Rep. of Germany

[21] Appl. No.: 589,081

[22] PCT Filed: Jun. 15, 1983

[86] PCT No.: PCT/EP83/00156
§ 371 Date: Feb. 15, 1984
§ 102(e) Date: Feb. 15, 1984

[87] PCT Pub. No.: WO84/00021
PCT Pub. Date: Jan. 5, 1984

[30] Foreign Application Priority Data
Jun. 16, 1982 [DE] Fed. Rep. of Germany ....... 3222614

[51] Int. Cl.$^4$ ............................. B60T 8/18; B60T 8/26
[52] U.S. Cl. .................................... 303/6 R; 303/22 R
[58] Field of Search ................. 303/6 C, 6 R, 61–63, 303/22 A, 22 R, 24, 23 R; 188/349, 195; 137/102

[56] References Cited
U.S. PATENT DOCUMENTS
3,741,610  6/1973  Holland ................. 303/22 R X
4,221,437  9/1980  Doerfler ..................... 303/6 C FOREIGN PATENT DOCUMENTS
1655003  5/1971  Fed. Rep. of Germany .
1780560  2/1972  Fed. Rep. of Germany .
2708941  9/1978  Fed. Rep. of Germany .
2853904  6/1980  Fed. Rep. of Germany .
2923018 12/1980  Fed. Rep. of Germany .
2351830 12/1977  France .
 773642  5/1957  United Kingdom .
 987689  3/1965  United Kingdom ............. 303/22 A Primary Examiner—Douglas C. Butler
Attorney, Agent, or Firm—Brumbaugh, Graves, Donohue & Raymond

[57] ABSTRACT

In the particular embodiments of the invention described in the specification, a hydraulic brake pressure regulator for the hydraulic brake system of a motor vehicle is designed to provide a family of characteristic curves which are dependent upon the vehicle load (outlet pressure as a function of inlet pressure), in which each characteristic curve follows a nonlinear and constant course, so as to provide optimum conformance with the ideal braking-force distribution of the vehicle.

13 Claims, 10 Drawing Figures

HYDRAULIC BRAKE PRESSURE REGULATOR

BACKGROUND OF THE INVENTION

This invention relates to hydraulic brake pressure regulators for hydraulic brake systems of motor vehicles, and, more particularly, to brake pressure regulators having a family of characteristic curves dependent upon a vehicular parameter such as outlet pressure as a function of inlet pressure.

Such brake pressure regulators are used to obtain braking performance for a motor vehicle which is independent of variable vehicular parameters, such as the load on the rear axle or the deceleration of the vehicle, to provide as nearly as possible a constant braking performance for the vehicle.

It is common knowledge that when a motor vehicle is braked the front axle becomes more heavily loaded, in comparison with its static load, and the rear axle is correspondingly unloaded. As is known, optimum braking of a vehicle is obtained when the front and rear axles require the same frictional brake contact at particular road conditions and at a particular speed. This is the case when, for instance, the front and rear axles, on braking, simultaneously reach the transition region for locking.

When the dimensions, weight and location of the center of gravity of the vehicle are known, the optimum distribution of the braking force between the front and rear axles may be calculated. This ideal braking-force or braking-pressure distribution represented by $P_1$ (front) and $P_2$ (rear), referred to the weight G of the vehicle, is shown qualitatively in FIG. 1 for the "full load" condition by the upper thin solid line and for the "empty load+driver" condition by the lower solid line. It may be seen that continuous nonlinear characteristic curves are involved here. A separate curve (not shown), lying between these upper and lower boundary lines, applies to each intermediate load condition of the vehicle.

Locking of the rear wheels before the front wheels are locked should be avoided in every load condition because it results in unstable driving performance. To avoid such overbraking of the rear axle, the distribution of braking forces to the front and rear axles must be selected in designing a hydraulic brake system so that the effective braking force on the rear axle is never higher than the braking force shown in FIG. 1 for the case of ideal braking.

It would thus be possible to avoid overbraking of the rear axle in simple fashion by providing a fixed braking-force distribution which could, for example, be aimed at making the real braking-force distribution at braking, a=0.8, a point of the ideal braking-force distribution for the load case "empty load+driver" i.e., the lower thin line shown in FIG. 1. In such a fixed braking-force distribution, the straight line represented in FIG. 1 as a heavy solid line would then be produced.

It is easy to see that, with such a fixed braking-force distribution, the ideal conditions would be present only for this special load case and for the assumed braking a=0.8, whereas with greater loading of the vehicle or with a smaller demand for frictional contact conditions far from ideal braking performance would result.

In order to at least approximate the actual braking-force distribution of a motor vehicle to the ideal braking-force distribution, pressure regulators having a bent characteristic line with a knee position which varies according to the load, are disclosed, for example in DE-AS No. 1,655,003, FIG. 3, and are already included in many vehicles. Typical characteristic bent lines of such a known brake pressure regulator are indicated by dashed lines in FIG. 1. Even when such a known load-dependent brake pressure regulator is used, the real braking-force distribution is still clearly far from the ideal distribution.

A better approximation of the ideal braking-force distribution is provided by hydraulic brake regulators whose family of characteristic lines consists of a group of bent straight lines in which both the slope and the knee are variable in accordance with the load. Such brake pressure regulators are disclosed in, for example, DE-OS No. 2,708,941 and DE-OS No. 2,923,018. The two boundary lines of such known brake pressure regulators, which might alternatively be called characteristic line regulators having a load-dependent knee, are indicated by dash-dotted lines in FIG. 1. But even these known hydraulic brake pressure regulators having their degressive characteristic lines still leave a great deal to be desired with respect to their adaptability to ideal braking-force distribution. In addition, they are comparatively complicated in design. One known brake pressure regulator of this type (DE-OS No. 2,923,018) works, for example, like known characteristic regulators (DE-OS No. 1,780,560) using the principle of the scale balance, in which the effective lever lengths of a scale balance cooperating with two piston members are automatically varied as a function of the vehicle load. This brake pressure regulator is not only mechanically complicated, but likewise has a comparatively large size.

The object of the invention is to provide an improved hydraulic brake pressure regulator for the hydraulic brake system of a motor vehicle, having a family of characteristic curves dependent upon a vehicle parameter such as outlet pressure as a function of inlet pressure.

Another object of the invention is to provide a hydraulic pressure regulator which not only provides a family of characteristic curves adapted as closely as possible to the ideal braking-force distribution but also has comparatively low construction and manufacturing costs and small spatial requirements.

SUMMARY OF THE INVENTION

These and other objects of the invention are attained by providing a hydraulic brake pressure regulator for the hydraulic brake system of a motor vehicle especially designed to provide a family of characteristic curves which are dependent upon a vehicle parameter such as outlet pressure as a function of inlet pressure in which each curve of the family is a continuous non-linear curve which may be degressive or progressive. A particular form of regulator prepared in accordance with the invention includes a first chamber with an inlet and a second chamber with an outlet separated by an axially displaceable first piston having a control valve which may be opened and closed to permit a connection between the first and second chambers and including a second piston displaceable independently of the first piston to define the second chamber, the second piston being coupled to the control valve so that the opening and closing of the control valve is dependent upon the spacing of the two pistons, one piston also being coupled to a nonhydraulic force mechanism having a linear characteristic and the other pistons being coupled to a nonhydraulic second force mechanism which is dependent upon a vehicle parameter. One of the force mechanisms acts on the first piston in a direction opposing pressure applied through the first inlet and the other acts on the second piston in the same direction. The brake regulator of the invention may be inserted in the hydraulic pressure line between the main brake cylinder and the brake cylinder of the rear axle or between the main brake cylinder and the brake cylinder of the front axle of the vehicle and the first force mechanism may be a linear spring while the second force mechanism may be a pneumatic piston.

BRIEF DESCRIPTION OF THE DRAWINGS

The invention and preferred embodiments thereof are explained hereinafter in greater detail with reference to the accompanying drawings, in which.

DESCRIPTION OF PREFERRED EMBODIMENTS

Figure 2:
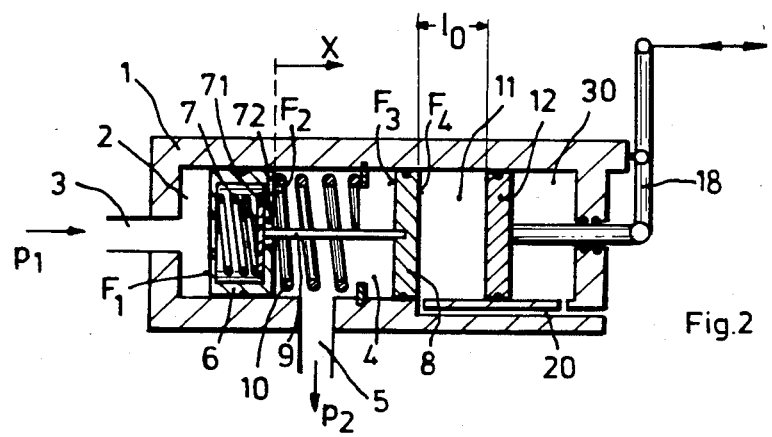
FIG. 2 is a view in longitudinal section illustrating a first embodiment of a brake pressure regulator pursuant to the invention for incorporation into the brake circuit of the front axle of a vehicle.

A typical hydraulic brake pressure regulator pursuant to the invention as shown in FIG. 2 consists of a regulator housing 1 with a first pressure chamber 2 and a second pressure chamber 4, which are separated from each other by an axially displaceable first piston 6. The first pressure chamber 2 has a pressure inlet 3 through which a hydraulic medium having an inlet pressure $P_1$ supplied, for example, from a main brake cylinder of the motor vehicle, is introduced into the first pressure chamber. The second pressure chamber 4 has a pressure outlet 5 through which the hydraulic fluid may be supplied, at an outlet pressure $P_2$, which is lower than the inlet pressure $P_1$, to hydraulically operated devices such as the front or rear wheel brake cylinders of the brake system.

Spaced from the first piston 6 is a second piston 8, which is axially movable independently of the first piston and which limits the second pressure chamber 4 in the axial direction. A regulating valve 7, having a valve member 71, cooperating with a valve bore 72 is arranged in the first piston 6, and a rod-shaped force transmitting member 9 extends from the second piston 8 to releasably engage the valve member 71. Thus the opening and closing of the control valve 7 depends upon the axial distance between the two pistons 6 and 8. Opening and closing of the control valve 7 intermittently connects the chambers 2 and 4, permitting hydraulic fluid to flow between them and transmitting pressure from one chamber to the other.

Each of the two pistons 6 and 8 is acted upon by a non-hydraulic opposing force, the two forces being independent of one another. These opposing forces are directed so that they counteract the force exerted by the inlet pressure $P_1$ on the first piston 6 and/or the force exerted by the outlet pressure $P_2$ on the second piston 8. One opposing force is produced by a nonhydraulic first force mechanism in the form of a mechanical elastic device such as a spring 10 having a linear characteristic and the second opposing force is produced by another hydraulic force mechanism, independent of the device 10, in the form of a pneumatic elastic device 11 having a progressive characteristic. While the progressive characteristic of the second force mechanism, that is, the pneumatic elastic device 11, is variable as a function of vehicle parameter, in particular, as a function of vehicle load, the linear characteristic of the first elastic mechanism, the mechanical elastic device 10, is invariable.

A hydraulic brake pressure regulator designed in this fashion has a family of characteristic curves which are dependent upon a vehicle parameter i.e., the outlet pressure of the regulator as a function of inlet pressure, the individual curves of which follow a nonlinear and entirely continuous curve i.e., one with no knee, so that it becomes possible to adapt the actual braking-force distribution of a vehicle equipped with such a hydraulic brake pressure regulator very closely to the ideal braking-force distribution.

Depending on which of the two different nonhydraulic force mechanisms the two pistons 6 and 8 cooperate with, the nonlinear curves of the family of characteristic curves (outlet pressure as a function of inlet pressure) will follow a course which is either degressive, i.e. continuously decreasing with respect to a straight-line relation, or progressive i.e., continuously increasing with respect to a straight-line relation. Thus, to obtain the desired almost ideal braking-force distribution, brake pressure regulators according to the invention having a degressive course of characteristic curves may be connected in the customary manner between the main brake cylinder and the wheel brake cylinders of the rear axle of the vehicle, as indicated schematically in FIG. 10.

Figure 9:
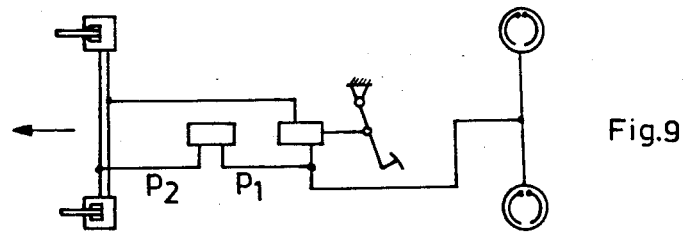
FIG. 9 is a schematic diagram illustrating an example of a hydraulic brake system with a brake pressure regulator pursuant to FIG. 2 or FIG. 3, arranged in a brake circuit for the front axle of a vehicle.

On the other hand, hydraulic brake pressure regulators for obtaining the almost ideal braking-force distribution which have a family of progressive characteristic lines must be connected between the main brake cylinder and the wheel brake cylinders of the front axle of the vehicle, as indicated schematically in FIG. 9.

Figure 3:
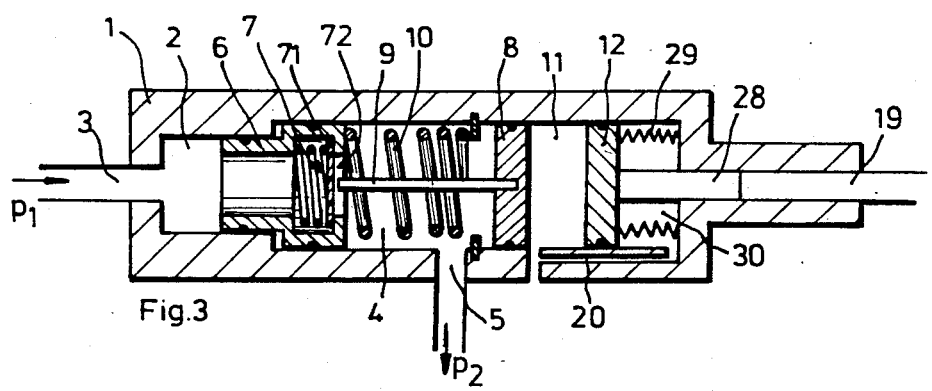
FIG. 3 is a view in longitudinal section, similar to that of FIG. 2, illustrating a second embodiment of a brake pressure regulator according to the invention.
Figure 10:
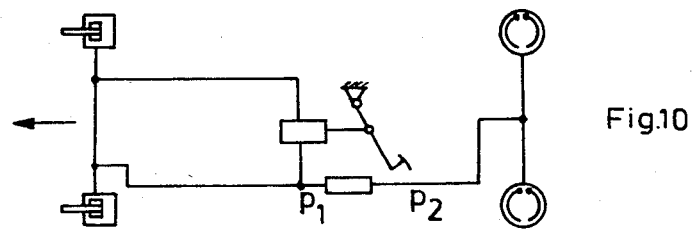
FIG. 10 is a schematic diagram showing an embodiment of a hydraulic brake system with a hydraulic brake pressure regulator pursuant to any of FIGS. 5-7, arranged in the brake circuit for the rear axle of a vehicle.

While the arrangement of FIG. 10 may preferably be utilized in ordinary passenger cars, the arrangement according to FIG. 9 is preferably used in trucks, in which the difference between full load and empty load is especially great. FIGS. 2 and 3 show two representative brake pressure regulators according to the invention by which a family of characteristic curves following a progressive course may be obtained.

Figure 4:
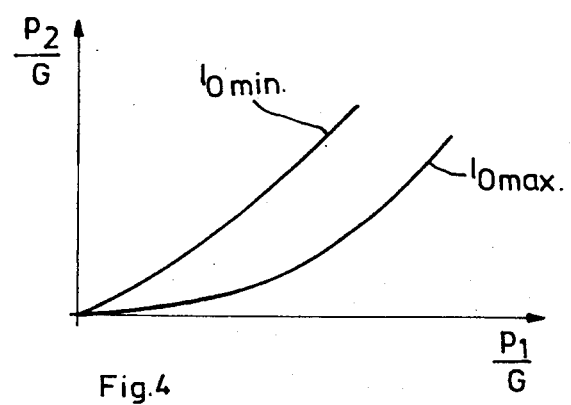
FIG. 4 is a graphical representation showing a family of characteristic curves, obtainable with the brake pressure regulators of FIGS. 2 and 3, illustrating the relation between the regulator outlet pressure and the regulator inlet pressure related to the weight of the vehicle.

FIG. 4 is a graphical representation illustrating one such family of progressive characteristic curves where the outlet pressure $P_2$ and the inlet pressure $P_1$ are in each instance related to the weight G of the vehicle and only the two boundary curves "full load" and "empty load+driver" are shown.

In the two brake pressure regulators according to FIGS. 2 and 3, the first force mechanism having a linear characteristic, i.e., the mechanical elastic device 10, cooperates with the first piston 6 in FIG. 2 or 6a in FIG. 3. In these examples, the device 10 is a compression spring, having one end engaging a spring ring, and the other end engaging the head of the piston 6 or 6a.

The nonhydraulic second force mechanism having a progressive characteristic, namely the pneumatic elastic device 11, cooperates with the second piston 8. It has a compression chamber filled with a compressible gaseous medium which is variable in size in accordance with a vehicle parameter, such as the vehicle load. In these embodiments the compression chamber of the pneumatic elastic device 11 is designed as a cylindrical chamber integrated into the regulator housing 1, with an axially displaceable first cylinder end piston 12, the axial position of which is displaceable in accordance with a parameter of the vehicle, for example, the vehicle load, and with an axially displaceable second cylinder end member which is connected to one of the two pistons. In the embodiments of FIGS. 2 and 3 this axially displaceable second cylinder end member of the compression chamber is formed by the second piston 8 itself.

By controlling the size of the compression chamber of the pneumatic elastic device 11 the effective characteristic curve of elasticity of this elastic device may be selectively varied. In FIG. 2 this possibility is indicated schematically by a rod 18, by means of which the first cylinder end 12 may be axially shifted further to the left or to the right, the type of adjusting force basically being of no significance to the invention. It might, for example, be produced mechanically or electrically, in particular, by a non-reactive drive by way of a spindle.

Figure 5:
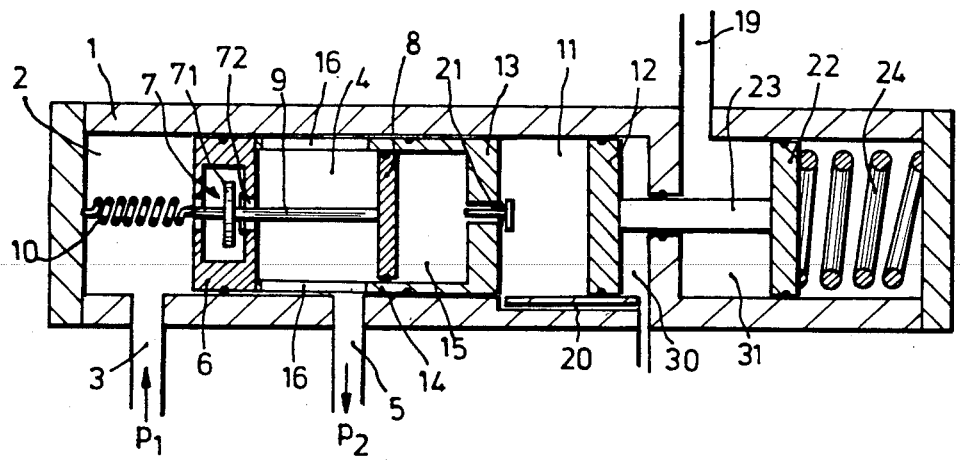
FIG. 5 is a view in longitudinal section illustrating a first embodiment of a brake pressure regulator for incorporation into the brake circuit of the rear axle of a vehicle.
Figure 6:
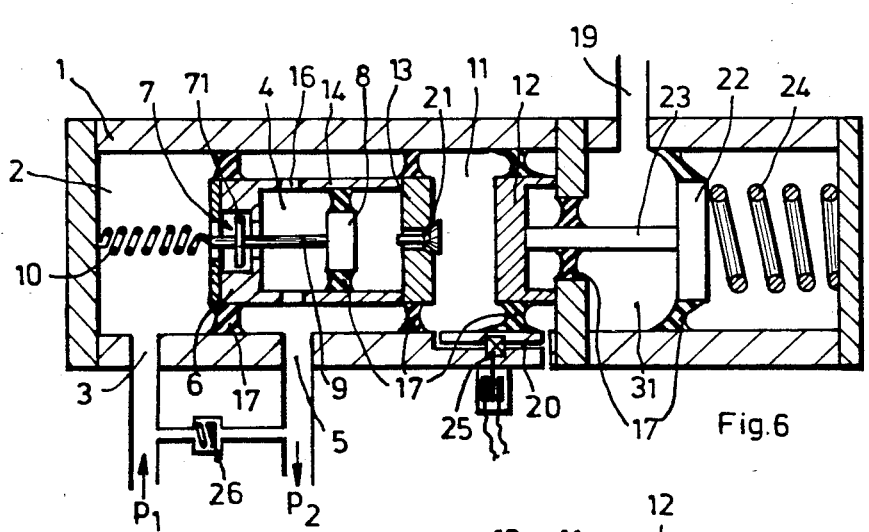
FIG. 6 is a view in longitudinal section similar to that of FIG. 5 showing another embodiment of the invention.

Instead of displacing the first cylinder and 12 of the compression chamber mechanically or electromechanically, it may alternatively be displaced pneumatically or hydraulically, as shown, for example, in the embodiments of FIGS. 3 and 5 and 6. In these embodiments the brake pressure regulator has an additional pressure inlet, namely an adjusting inlet 19, 19' or 19" by way of which a pressure medium acting directly or indirectly on the first cylinder end 12, 12' or 12" may be introduced to enlarge or reduce the compression chamber 11, 11' or 11" i.e., by axial displacement of the cylinder end 12, 12' or 12".

In the embodiment according to FIG. 3, the pressure medium supplied by way of the adjusting inlet 19 acts by way of the piston rod 28 directly on the first cylinder end 12, and specifically acts against the force of a tension spring device 29 in the opposite direction on the cylinder end.

To give the brake pressure regulator a desired vehicle load-dependent family of characteristic curves, the size of the compression chamber 11, i.e., the distance designated "$l_0$" in the drawings between the cylinder end 12 and the piston 8, must be varied according to the vehicle load and, specifically, such that at the empty load+driver condition, $l_0$ has a selected minimum value and at full load $l_0$ has a selected maximum value.

In the embodiment shown in the example of FIG. 3, a pressure medium is used for displacement of the axial position of the first cylinder end 12. The pressure applied by the pressure medium to the face of the rod 28 is inversely proportional to the weight of the vehicle, i.e., of the load of the vehicle, so that the displacing force acting on the face of the piston 28 is smaller at the full load condition than at the empty load+driver condition.

The hydraulic brake pressure regulators illustrated in FIGS. 2 and 3 are essentially identical. Only to indicate various conceivable design possibilities, the embodiment of FIG. 3, unlike that of FIG. 2, has its first piston 6a constructed as a stepped piston and its first cylinder end 12 adjusted hydraulically, rather than mechanically, in its axial position.

In operation of the embodiments shown in FIGS. 2 and 3, when the brake system is unpressured, i.e., the brakes are not actuated, the pistons 6, 6a and 8, as well as the first cylinder end 12, are in positions illustrated in the drawings. The mechanical elastic device 10 having a linear characteristic, designed as a compression spring, is slack. The second piston 8 is axially positioned so that an equalizing channel 20, communicating with the compression chamber 11, is open. In the illustrated examples air is used as the compressible gaseous medium; it is therefore easily possible to lead the equalizing channel 20 to the outside of the regulator so that the initial pressure $P_0$ prevailing in the compression chamber 11 at this point of time corresponds to the atmospheric pressure. If for some reason another compressible gaseous medium is used, the equalizing channel must lead, accordingly, to a corresponding gas reservoir with a defined initial pressure.

The axial position of the first cylinder end 12 is positioned according to the load of the vehicle, that is, for example, according to the level of the vehicle with respect to the rear axle. Specifically, as already stated, the cylinder end 12 is positioned so that the compression chamber 11 formed between the second piston 8 and the first cylinder end 12 is large at high load and correspondingly small at low load. In this configuration the valve member 71 of the control valve arranged in the first piston 6 lies on its valve seat from play, so that the valve bore 72 is closed.

When the brake pedal is actuated, a pressure is developed in the main brake cylinder of the motor vehicle, which is supplied as the inlet pressure $P_1$ at the pressure inlet of the brake pressure regulator. The pressure $P_1$ acts upon the piston face $F_1$ of the first piston 6 which faces the first pressure chamber 2. As a result, the first piston is moved a distance X toward the right as shown in the drawing. This motion of the first piston 6 causes the valve member 71 of the control valve, coupled by way of the rod-shaped force-transmitting member 9 with the second piston 8, to be raised from its valve seat, so that the hydraulic pressure medium may flow through the valve bore 72 into the second pressure chamber 4, in which a pressure $P_2$ develops.

Thus, the pressure $P_2$ acts simultaneously on the first piston 6 and on the second piston 8, so that, on the one hand, the first piston 6 is moved a small distance opposite the X direction and, on the other, the second piston 8 is moved in the X direction. The valve member 71 of the control valve then returns to its valve seat and, at the same time, the aperture of the equalizing channel 20, which opens into the compression chamber 11, is shut off by the second piston 8, so that the compression chamber 11 becomes effective as a pneumatic elastic mechanism having a progressive characteristic.

The deflection of the two pistons 6 and 8, which are moved essentially independently of one another, continues until the forces applied to them are in equilibrium, after which the control valve 7 is closed and the two pistons have travelled equidistant paths. This state of equilibrium is determined by the effective pressure and the elastic forces applied to the two pistons 6 and 8.

In the stationary state of equilibrium the following equations apply:

$$P_1 \cdot F_1 - P_2 \cdot F_2 - k \cdot X = 0 \qquad (1)$$

and:

$$P_2 \cdot F_3 - P_i \cdot F_4 = 0 \qquad (2)$$

where:
$P_1$ = inlet pressure of the brake pressure regulator
$P_2$ = outlet pressure of the brake pressure regulator
$P_i$ = pressure in the compression chamber 11 on compression of its compressible gaseous medium
$F_1$ = effective piston area of the first piston 6 facing the first pressure chamber 2
$F_2$ = effective piston area of the first piston 6 facing the second pressure chamber 4
$F_3$ = effective piston area of the second piston 8 facing the second pressure chamber
$F_4$ = effective piston area of the second piston 8 at the second cylinder end
$k$ = force constant of the mechanical elastic device 10
$X$ = displacement of the first piston 6.

As soon as the aperture of the equalizing channel 20 opening into the compression chamber 11 is closed off by the second piston 8, the gaseous medium found in the said chamber is compressed by further motion of the second piston 8 in the X direction. If we assume a polytropic change of state for this compression, then the compression is effected according to the equation:

$$\frac{P_i}{P_0} = \left(\frac{V_0}{V_i}\right)^n, \qquad (3)$$

from which it follows that $$P_i = P_0 \left(\frac{l_0}{l_0 - X}\right)^n$$

where, inter alia:
$P_0$ = initial pressure, specifically atmospheric pressure, in the compression chamber 11 before compression
$V_0$ = initial volume of compression chamber
$V_i$ = volume of the compression chamber 11 after compression
$l_0$ = initial axial length of the compression chamber (distance of the second piston 8 from the first cylinder end 12)
n = polytropic exponent.

Finally, substituting the expression for $P_i$ from Equation 3 in Equation 2 and substituting the expression for X derived from Equation 2 in Equation 1, the following expression is obtained:

$$P_1 \cdot F_1 - k \cdot l_0 \left[1 - \left(\frac{P_0 \cdot F_4}{P_2 \cdot F_3}\right)^{1/n}\right] - P_2 \cdot F_2 = 0 \qquad (4)$$

With $l_0$ as a variable parameter, a family of characteristic curves, as illustrated by the envelope in FIG. 4, for the brake pressure regulator represented in FIGS. 2 and 3 follows from the above equation. Using appropriate sizes for the various piston areas $F_1$ to $F_4$ (including, for example, a stepped piston and stepped cylinder arrangement), and appropriate force constants k for the mechanical elastic device 10 and, if desired, an initial system pressure $P_0 > P_{atmospheric}$, possibly in conjunction with an initial tension in the spring, all possible characteristic curves may be obtained with the curvature tendency shown in FIG. 4 using all possible quasilinear characteristic lines with $l_0$ as a variational parameter. The characteristic of the regulator is, of course, also influenced by the polytropic exponent n, i.e., by the type of compressible gaseous medium used.

Because of the progressive characteristic of the pneumatic elastic mechanism formed by the compression chamber 11, the position of the second piston 8 does not change linearly with the outlet pressure $P_2$. The result of this, in turn, is that the outlet pressure $P_2$ is a nonlinear function of the inlet pressure $P_1$. The ratio between the linearly increasing spring force $k \cdot X$ of the mechanical elastic mechanism 10, which acts on the first piston 6 or 6a, and the progressively increasing compressive force $P_i \cdot F_4$ of the pneumatic elastic mechanism 11 varies according to the magnitude of the initial volume $V_0$ or the initial axial length $l_0$ of the compression chamber 11, because of the fixed path connection between the first piston 6 or 6a and the second piston 8. Consequently $l_0$ is the determining value for the corresponding initial rise of the outlet pressure $P_2$ in the family of characteristic lines of FIG. 4. When the initial length $l_0$ or the initial volume $V_0$ of compression chamber 11 is varied as a function of vehicle load, as previously explained, a family of characteristic curves is produced having constant and nonlinear characteristic courses with the vehicle load as the variable parameter. Since the course, i.e., the curvature, of each of the characteristic curves may be controlled by the values used for the various regulator pistons and elastic mechanisms, the family of characteristic curves of the brake pressure regulators may be very closely approximated to the desired ideal braking-force distribution.

Axial displacement of the first cylinder end 12 to vary the value $V_0$ or $l_0$ is conveniently effected when the brake is not actuated, i.e., when the outlet pressure is $P_2 = 0$. In this condition, the second piston 8 assumes its initial position, shown in the drawings (X = 0), in which the apertures of the equalizing channel 20, leading from the compression chamber 11, is still open. The pressure connection then existing between the compression chamber 11 and the chamber 30 makes possible a reactionless displacement of the first cylinder end 12. It is, of course, also possible to displace the first cylinder bottom 12 during a braking process (X=0). This condition, however, requires a higher expenditure of force, so that it is then advisable to accomplish the change in position of the first cylinder end 12 in a self locking manner.

Equations 1–4 have been set forth primarily to make clear that the use of the pneumatic elastic mechanism 11 having a progressive characteristic results in a continuous but nonlinear dependence between the inlet pressure $P_1$ and the outlet pressure $P_2$. The equations themselves, however, apply only in first approximation, since, for example, the effective areas of the control valve are not further considered. Practical considerations will show, however, that operability of the brake pressure regulator requires that the effective area $F_3$ of the second piston 8 (or in modified embodiments a corresponding area) must be greater than the effective valve area of the control valve 7, so that the control valve may close after it has been opened.

Figure 7:
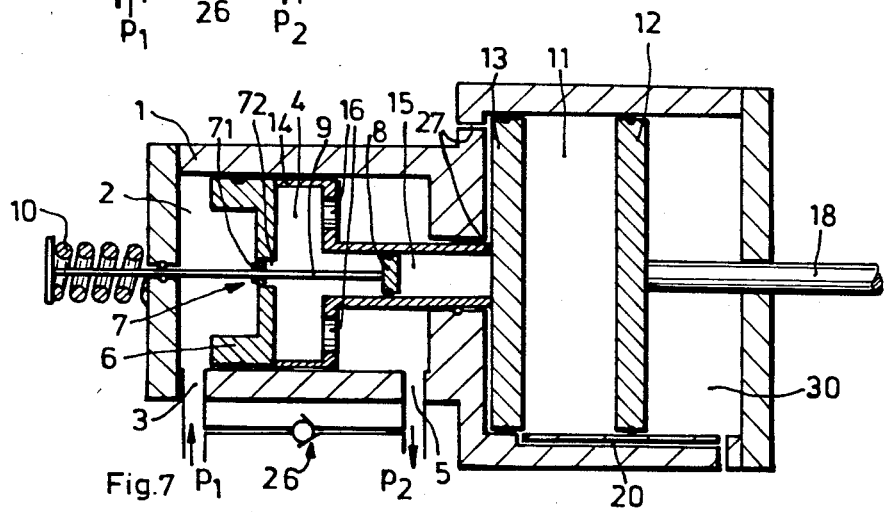
FIG. 7 is a view in longitudinal section similar to that of FIG. 5 showing a further embodiment of the invention.

FIGS. 5 to 7 illustrate three representative embodiments of brake pressure regulators by which a family of characteristic curves each following a degressive course may be obtained. A preferred embodiment is shown in FIG. 7.

Figure 8:
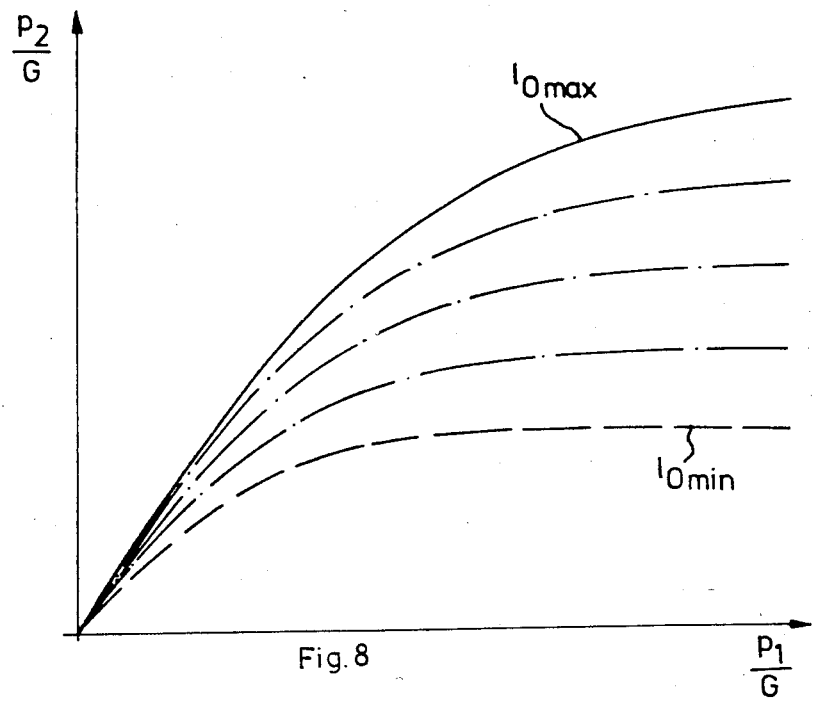
FIG. 8 is a graphical representation showing a family of characteristic curves, obtainable with the brake pressure regulators of FIGS. 5-7, illustrating the relation between the regulator outlet pressure and the regulator inlet pressure related to the weight of the vehicle.

A degressive family of characteristic curves obtainable with the said brake pressure regulators is illustrated in FIG. 8. In FIG. 8, the solid line curve represents the characteristic line applying at "full load" condition resulting in positioning of the end member 12 at the "$l_0$ max" position and the dashed line curve corresponds to the "empty load + driver" condition resulting in positioning of the end member 12 at the "$l_0$ min" position. The intermediate dot-dash lines represent characteristic curves corresponding to vehicle loads between full load and empty load.

In the FIGS. 5–7 embodiments, the nonhydraulic first force mechanism having a linear characteristic, i.e., the mechanical elastic device 10" or 10"' acts—unlike the embodiments of FIGS. 2 and 3—not on the first piston 6', 6" or 6"' but, rather on the second piston 8', 8" or 8"' and the nonhydraulic second force mechanism having a progressive characteristics, i.e., the pneumatic elastic mechanism 11', 11" or 11"' acts on the first piston 6', 6" or 6"' rather than on the second piston. Otherwise, however, the brake pressure regulators of FIGS. 5–7 are essentially identical, in their design and with reference to their method of operation, to those of FIGS. 2 and 3. Accordingly, it will be necessary to describe only one of these embodiments in detail, like elements in the three being provided with like primed, double primed or triple primed reference numerals.

Thus, the difference between the FIG. 5 embodiment and the embodiments of FIGS. 2 and 3 is that the nonhydraulic first force mechanism having a linear characteristic, i.e., the mechanical elastic mechanism 10', acts on the second piston 8' and the nonhydraulic second force mechanism having a progressive characteristic, namely the pneumatic elastic mechanism with the compression chamber 11', acts on the first piston 6'. Here, too, the compression chamber 11' of the pneumatic elastic mechanism is designed as a cylindrical chamber with an axially displaceable first cylinder end 12', the axial position of which is displaceable as a function of a vehicle parameter, in particular, as a function of the load of the vehicle. In contrast to the embodiments of FIGS. 2 and 3, the cylindrical chamber on the side facing the first cylinder end 12' is limited axially not by the second piston 8' itself, but by an axially displaceable second cylinder end 13', which is rigidly connected to the first piston 6'. For this purpose it has a cylindrical extension 14' projecting away from the compression chamber 11', the free end of which extension rests against the first piston 6' and forms a guide cylinder 15', within which the second piston 8' is axially displaceable. In the cylindrical wall of the extension 14' there are openings 16' which provide a constant connection between the second pressure chamber 4' and the pressure outlet 5'.

In operation of the embodiment of FIGS. 5–7, when the brake pedal is actuated, the inlet pressure $P_1$, produced by the main brake cylinder of the motor vehicle and effective in the first pressure chamber 2 of the brake pressure regulator, acts on the first piston 6', whereby that piston is deflected in X direction. The valve member 71' of the control valve 7' is thereby lifted from its valve seat so that the valve opening 72' is exposed and the hydraulic fluid flows into the second pressure chamber 4', producing an outlet pressure $P_2$ in that chamber. The deflection of the first piston 6' in the X direction likewise causes the second cylinder end 13', which engages the piston 6 through the cylindrical extension 14', to be simultaneously displaced by the same distance in the X direction. This causes the aperture of the equalization channel 20', opening into the compression chamber 11', to be closed off. In accordance with the displacement of the second cylinder end 13', the volume of the compression chamber 11' is reduced by the factor ($l_0 - X$), whereby the pressure in the compression chamber rises, according to the polytropic equation, from its initial pressure $P_0$ to:

$$P_i = P_0 \cdot \left(\frac{V_0}{V_i}\right)^n$$

$$= P_0 \cdot \left(\frac{l_0}{l_0 - X}\right)^n$$

The pressure $P_i$, rising progressively with the deflection of the second cylinder end 13', exerts a progressively rising opposing force $P_i \cdot F_4$ on the second cylinder end, $F_4$ being the effective area of the second cylinder end. In contrast to the embodiments of FIGS. 2 and 3, the first piston 6' is thus not acted on by an elastically-induced linear opposing force, but, rather, by an elastically-induced opposing force.

The valve member 71' in the first piston 6' is rigidly connected, by way of the rod-shaped force-transmitting member 9', with the second piston 8', which is within the guide cylinder 15'. Since the second piston 8', acted on by the force $P_2 \cdot F_3$, is likewise deflected in the X direction against the force of the mechanical elastic mechanism 10', the valve bore 72' is eventually shut off by the valve member 71'.

In the state of equilibrium the two pistons 6' and 8' are deflected the same distance and the control valve 7' is closed. The following force equations then apply to the two pistons 6' and 8':

Piston 6': $P_1 \cdot F_1 - P_2 \cdot F_2 - P = 0$, (5)

where approximating, $P = P_i \cdot F_4 - P_0 \cdot F_4$ applies.

Taking into account that, on a polytropic change of state in the compression chamber 11', $$P = F_4 \left[ P_0 \left( \frac{l_0}{l_0 - X} \right)^n - P_0 \right]$$

it follows that:

$$P_1 \cdot F_1 - P_2 \cdot F_2 - F_4 \left[ P_0 \left( \frac{l_0}{l_0 - X} \right)^n - P_0 \right] = 0 \qquad (6)$$

The equation $$P_2 \cdot F_3 - k \cdot X - P_0 \cdot F_3 = 0 \qquad (7)$$

correspondingly applies to the second piston 8'. Since in the state of equilibrium the two pistons 6' and 8' are deflected equidistantly, the distance X in Equations 6 and 7 is the same. From this the equation for the relation between inlet pressure $P_1$ and the outlet pressure $P_2$ may be obtained:

$$P_1 \cdot F_1 - P_2 \cdot F_2 - F_4 \left[ P_0 \left( \frac{1}{1 - \frac{P_2 \cdot F_3 - P_0 \cdot F_3}{k \cdot l_0}} \right)^n - P_0 \right] = 0 \qquad (8)$$

Since the brake pressure regulator described in Equation 8 is technical significant only when the denominator of the expression in parenthesis is positive, the value $$P_{2\,max} = \frac{k \cdot l_0}{F_3} + P_0$$

represents the greatest possible outlet pressure of the brake pressure regulator.

Equations 5 to 8 likewise apply only in first approximation, as some simplifications have been made. Among other things, it has been assumed that the initial pressure $P_0$ prevailing in the guide cylinder 15' retains its value corresponding to atmospheric pressure, even when the second piston 8' moves. If the mechanical elastic mechanism 10' has a large force constant k, this assumption may be considered valid. However, if the force constant k is comparatively small and therefore the product k·X is not in every case much greater than the product $P_i \cdot F_4$, care must be taken to see that the guide cylinder 15' has a connection to the outside, or else the characteristic of the regulator will change somewhat. If such an equalizing connection is not provided, as in FIGS. 5 and 6, then it is advantageous to arrange a check valve 21' or 21' in the second cylinder end 13', or 13' by way of which any excess pressure with respect to the compression chamber 11' or 11" when the brake is not actuated may be eliminated.

Figure 1:
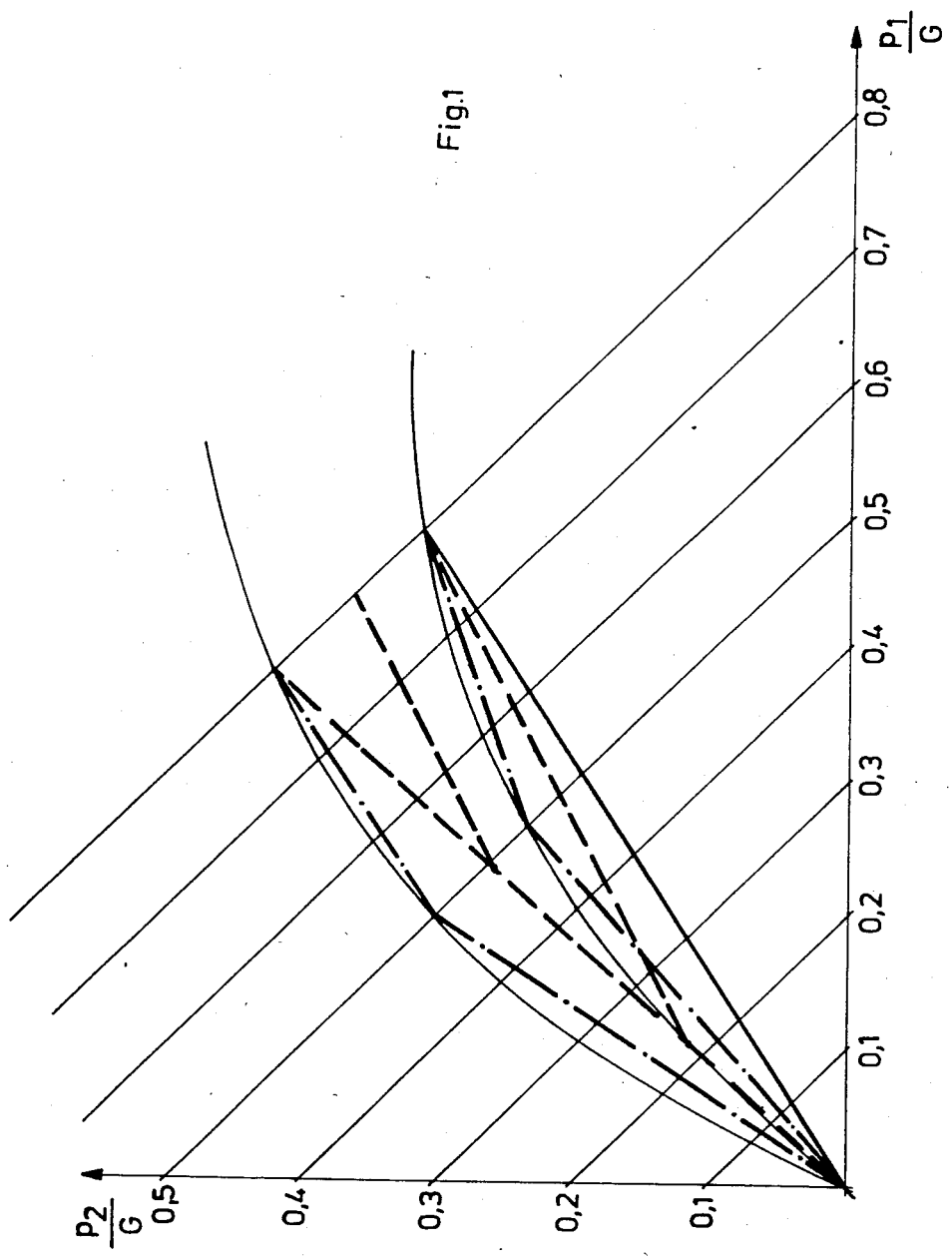
FIG. 1 is a graphical representation showing a family of characteristic lines of the braking-force distribution of a motor vehicle.

Appropriate sizing of the various regulator parameters makes it possible to establish the family of characteristic curves of the brake pressure regulator within a very wide range, the comparatively strongly curved courses of the characteristic lines in FIG. 8 being quasi-linear in the boundary case. With the brake pressure regulator according to the invention, therefore, it is possible to obtain, in simple fashion, a family of characteristic curves coming very close to the ideal braking-force distribution of FIG. 1.

The embodiments shown in FIGS. 6 and 7 operate in a manner similar to FIG. 5 as described above.

In FIGS. 5–7, as in the embodiments of FIGS. 2 and 3, the size of the compression chamber 11' 11" or 11''' is variable, in particular, as a function of the vehicle load. The initial axial length $l_0$ of this chamber is readjusted by axial displacement of the first cylinder end 12', 12" or 12''' which in the examples shown in FIGS. 5 and 6 is connected by way of a coupling rod 23' or 23" with an auxiliary piston 22' or 22" arranged within an auxiliary cylinder 31' or 31". The auxiliary piston is displaced axially within the cylinder 31' or 31" under the influence of a pressure medium supplied by way of the adjusting inlet 19' or 19" against the effect of an elastic mechanism 24' or 24". When the pressure in the auxiliary cylinder 31' or 31" is made proportional to the vehicle load, the second cylinder end 12' or 12" is in each instance displaced axially such that the magnitude of $l_0$ is proportional to the corresponding vehicle load.

As is easily seen in FIGS. 2–6, the regulating process is always associated with an increase in the volume of the space receiving the hydraulic pressure fluid. This increase in volume amounts to $$\Delta V = X \cdot F_3$$

and becomes small when either the displacement path X or the effective area $F_3$ of the second piston 8, 8' or 8" is kept small. Generally, on the one hand, the smaller the effective area $F_3$ and the greater the force constant k of the mechanical elastic mechanism 10, 10' or 10" is made, the smaller the displacement path X becomes; and, generally the greater the force constant k and the smaller the effective area $F_3$, the greater the highest attainable outlet pressure $P_2$ becomes. It is therefore advantageous to make the force constant k large and the effective area $F_3$ small, so that the brake pressure regulator can be made small enough that the "hydraulic dead space" $X \cdot F_3$, is insignificant with respect to any elasticities present in the brake circuit.

A brake pressure regulator modified in this way is represented in the embodiment of FIG. 7. In that brake pressure regulator the inside diameter of the guide cylinder 15''', in the region in which the second piston 8''' is located, is made substantially smaller than the diameter of the first pressure chamber 2 accomodating the first piston 6'''. The "hydraulic dead space" $\Delta V = X \cdot F_3$ is thus comparatively small in this embodiment.

When, in an optimum brake pressure regulator design, the displacement path X becomes so small that the aperture of the equalizing channel 20" opening into the compression chamber 11" can no longer be closed completely, then it is advantageous to provide, within the equalizing channel 20", a valve such as an electromagnetic valve or the like as indicated by the valve 25" in the embodiment of FIG. 6. The valve may be actuated by, for example, closing of the usual brake-light switch or, alternatively, when a selected, comparatively small, pressure in the brake circuit is exceeded. For the sake of completeness, additional equalizing channels 27''' are indicated in the embodiment of FIG. 7, through which the guide cylinder 15''' communicates with the atmosphere. As the result, a special check valves like 21' and 21" in the second cylinder ends 13' and 13" of the embodiments shown in FIGS. 5 and 6 are not necessary. In addition, a check valve 26''' is provided between the pressure inlet 3''' and the pressure outlet 5, to assure that the pressure at the pressure outlet 5 can never become greater than that at the pressure inlet 3'''.

As is shown in the embodiment of FIG. 6, it is alternatively possible, in principle, to omit all sealing rings when the pistons, piston rods and cylindrical end members, etc. to be sealed are suspended in axially elastic diaphragms 17''. The operation of this brake pressure regulator is the same as that of the regulator represented in FIG. 5. In this embodiment the electromagnetic valve 25'' as shown in the drawing must be provided since the channel 20'' can not otherwise be closed.

It is also possible by any conventional arrangement, not shown in the drawings, to prevent the basic or initial pressure $P_0$ of the compression chamber 11, 11', 11'' or 11''' from dropping below a given value, so that the regulating characteristic of the brake pressure regulator may be very strong.

I claim:

1. A hydraulic brake pressure regulator for the hydraulic brake system of a motor vehicle providing a family of characteristic curves which are dependent upon a vehicle parameter wherein each of the characteristic curves follows a nonlinear and continuous course comprising a housing having a first pressure chamber with a pressure inlet and a second pressure chamber with a pressure outlet, the first and second chambers being separated from one another by an axially displaceable first piston having a control valve which permits a pressure and flow connection for a hydraulic pressure medium between the first and second pressure chambers to be opened and closed, a second piston which is coaxial with respect to said first piston and axially displaceable independently of the first piston and which defines the second pressure chamber in the axial direction, the second piston being coupled by way of a rigid, force-transmitting member with the control valve so that opening and closing of the control valve is dependent upon the axial separation of the two pistons, a non-hydraulic first force mechanism having a linear characteristic, a non-hydraulic second force mechanism independent of the first force mechanism and having a variable, progressive characteristic dependent on a parameter of the vehicle, one of the force mechanisms acting on the first piston in a direction opposing the inlet pressure and the other force mechanism acting on the second piston in the same effective direction.

2. A hydraulic brake pressure regulator according to claim 1 for insertion between a main brake cylinder and a wheel brake cylinder of the rear axle of the vehicle wherein the nonhydraulic first force mechanism acts on the second piston and the nonhydraulic second force mechanism acts on the first piston.

3. A hydraulic brake pressure regulator according to claim 1 for insertion between a main brake cylinder and a wheel brake cylinder of the front axle of the vehicle wherein the nonhydraulic first force mechanism acts on the first piston and the nonhydraulic second force mechanism acts on the second piston.

4. A hydraulic brake pressure regulator according to claim 1 wherein the nonhydraulic second force mechanism comprises a pneumatic elastic mechanism including a compression chamber filled with a compressible gaseous medium having a size which is variable in accordance with a vehicle parameter.

5. A hydraulic brake pressure regulator according to claim 4 wherein the size of the compression chamber of the pneumatic elastic mechanism is variable in accordance with the vehicle load so that with no load it has a minimum value and with full load it has a maximum value.

6. A hydraulic brake pressure regulator according to claim 4 wherein the compression chamber comprises a cylindrical chamber having an axially displaceable first cylinder end, the position of which is dependent on a vehicle parameter, and an axially displaceable second cylinder end, which has a rigid connection with one of the two pistons.

7. A hydraulic brake pressure regulator according to claim 6 wherein the axially displaceable cylinder end has a cylindrical extension projecting away from the compression chamber forming a guide cylinder for the second piston, the end of the cylindrical extension engaging the first piston and an opening being provided in the wall of the cylindrical extension which provides a constant connection between the second pressure chamber and the pressure outlet.

8. A hydraulic brake pressure regulator according to claim 7, wherein the inside diameter of the guide cylinder at least in the region containing the second piston is substantially smaller than the diameter of the first pressure chamber which receives the first piston.

9. A hydraulic brake pressure regulator according to claim 6, wherein the axially displaceable end of the second cylinder is formed by the second piston.

10. A hydraulic brake pressure regulator according to claim 1 wherein at least some of said first and second pistons and said first and second axially displacecylinder ends are suspended in axially elastic diaphragms which, in addition to providing support, also provide a seal and separate the regions on the opposite sides thereof.

11. A hydraulic brake pressure regulator for the hydraulic brake system of a motor vehicle providing a family of characteristic curves which are dependent upon a vehicle parameter wherein each of the characteristic curves follows a nonlinear and continuous course comprising a housing having a first pressure chamber with a pressure inlet and a second pressure chamber with a pressure outlet, the first and second chambers being separated from one another by an axially displaceable first piston having a control valve which permits a pressure and flow connection for a hydraulic pressure medium between the first and second pressure chambers to be opened and closed, a second piston which is coaxial with respect to said first piston and axially displaceable independently of the first piston and which defines the second pressure chamber in the axial direction, the second piston being coupled by way of a rigid, force-transmitting member with the control valve so that opening and closing of the control valve is dependent upon the axial separation of the two pistons, a non-hydraulic first force mechanism having a linear characteristic and acting on said first piston in a direction opposing the inlet pressure, a non-hydraulic second force mechanism independent of the first force mechanism and having a variable, progressive characteristic dependent on a parameter of the vehicle acting on said second piston in the same effective direction as said first piston, said second force mechanism including a cylindrical compression chamber filled with a compressible gas and having an axially displaceable first cylinder end, the position of which is dependent on a vehicle parameter, and an axially displaceable second cylinder end which has a rigid connection with one of said two pistons, said axially displaceable second cylinder end having a cylindrical extension projecting away from the compression chamber and forming, for the second piston, a guide cylinder of substantially smaller cross-section than the cross-section of the first pressure chamber in which the first piston is disposed, the end of said cylindrical extension engaging the first piston and an opening being provided in the wall of the cylindrical extension which provides a constant connection between the second pressure chamber and said pressure outlet.

12. A hydraulic brake pressure regulator according to claim 11 wherein said first cylinder end is coupled to a third piston axially displaceable within an auxiliary cylinder against the effect of an elastic medium in response to a pressure medium proportional to vehicle load.

13. A hydraulic brake pressure regulator according to claim 12 wherein at least some of said first, second and third pistons and first and second cylinder ends are suspended in axially elastic diaphragms providing support and a seal therefor and separating the regions on opposite sides thereof, an equalizing channel is provided communicating with the compression chamber, with valve means responsive to actuation of the vehicle brake system for closing said equalizing channel.

* * * * *